US011526500B2

(12) United States Patent
Leu et al.

(10) Patent No.: US 11,526,500 B2
(45) Date of Patent: Dec. 13, 2022

(54) SYSTEM AND METHOD FOR INITIATING BULK INSERTS IN A DISTRIBUTED DATABASE

(71) Applicant: SAP SE, Walldorf (DE)

(72) Inventors: Hans-Joerg Leu, Dossenheim (DE); Srinivas Gajjalakonda, Leimen (DE)

(73) Assignee: SAP SE, Walldorf (DE)

( * ) Notice: Subject to any disclaimer, the term of this patent is extended or adjusted under 35 U.S.C. 154(b) by 76 days.

(21) Appl. No.: 16/712,442

(22) Filed: Dec. 12, 2019

(65) Prior Publication Data

US 2021/0182279 A1 Jun. 17, 2021

(51) Int. Cl.
| | | |
|---|---|---|
| *G06F 16/00* | (2019.01) | |
| *G06F 16/23* | (2019.01) | |
| *G06F 16/215* | (2019.01) | |
| *G06F 16/27* | (2019.01) | |
| *G06F 16/22* | (2019.01) | |

(52) U.S. Cl.
CPC ........ *G06F 16/2386* (2019.01); *G06F 16/215* (2019.01); *G06F 16/2255* (2019.01); *G06F 16/278* (2019.01)

(58) Field of Classification Search
CPC ............... G06F 16/2386; G06F 16/278; G06F 16/2255; G06F 16/215
See application file for complete search history.

(56) References Cited

U.S. PATENT DOCUMENTS

| | | | | |
|---|---|---|---|---|
| 5,970,495 | A * | 10/1999 | Baru | G06F 9/5088 |
| 9,460,147 | B1 * | 10/2016 | Chang | G06F 16/2386 |
| 10,031,935 | B1 * | 7/2018 | Cole | G06F 16/2315 |
| 2009/0150336 | A1 * | 6/2009 | Basu | G06F 16/284 |
| 2010/0250540 | A1 * | 9/2010 | Adda | G06F 16/2477 |
| | | | | 707/737 |
| 2013/0166534 | A1 * | 6/2013 | Yoon | G06F 16/9535 |
| | | | | 707/714 |
| 2015/0134626 | A1 * | 5/2015 | Theimer | G06F 11/3055 |
| | | | | 707/693 |
| 2017/0109386 | A1 * | 4/2017 | Baer | G06F 16/24554 |

FOREIGN PATENT DOCUMENTS

WO WO-2020073687 A1 * 4/2020 ............. G06F 16/22

* cited by examiner

*Primary Examiner* — Diedra McQuitery
(74) *Attorney, Agent, or Firm* — Sterne, Kessler, Goldstein & Fox P.L.L.C.

(57) ABSTRACT

Described herein is a system and method for initiating a bulk insert in a distributed database. The system described herein provides for a client to identify target index servers of the data records by examining the data records. The system identifies a partition criterion of the target index servers and partitions the data records based on a partition criterion, into subsets of data records. The system builds buckets including the subsets of data records that correspond to a partition. The system inserts each bucket including the subset of the data corresponding to a specific partition to the respective target index server where the specific partition is physically located and inserts the subset of data records in the table locally. The system inserts each bucket in each respective target index server in parallel.

20 Claims, 5 Drawing Sheets

SYSTEM AND METHOD FOR INITIATING BULK INSERTS IN A DISTRIBUTED DATABASE

BACKGROUND

A distributed database may be partitioned across multiple index servers or nodes. Each index server stores a portion of the data records corresponding to a table. While inserting data records into partitioned tables of the distributed database, the data records are pruned at the index server selected by the client, to connect to and uploaded respective index servers. By doing so, conventional systems add multiple hops of data transfer in between index servers of the distributed database. This procedure often results in increased cross-node (index server) communication and increased load on the main processing node. This load may be especially high when inserting billions of records.

BRIEF DESCRIPTION OF THE DRAWINGS

The accompanying drawings, which are incorporated herein and form a part of the specification, illustrate the embodiments of the present disclosure, and together with the description, further serve to explain the principles of the embodiments and enable a person skilled in the pertinent art to make and use the embodiments, individually, or as a combination thereof.

In the drawings, like reference numbers generally indicate identical or similar elements. Additionally, generally, the left-most digit(s) of a reference number identifies the drawing in which the reference number first appears.

DETAILED DESCRIPTION

Provided herein are system, apparatus, device, method and/or computer program product embodiments, and/or combinations and sub-combinations thereof for providing bulk inserts in a distributed database.

A database may be distributed across multiple index servers. A table of the index server may be partitioned across the index servers based on a partition criterion. In this regard, each index server may store a partition of the table.

The system described herein provides for a client to identify target index servers of the data records by examining the data records. The system identifies a partition criterion of the target index servers and partitions the data records based on a partition criterion, into subsets of data records. The system builds buckets including the subsets of data records that correspond to a partition. The system inserts each bucket including the subset of the data corresponding to a specific partition to the respective target index server where the specific partition is physically located and inserts the subset of data records in the table locally. The system inserts each bucket in each respective target index server in parallel.

This configuration provides for avoiding multiple hops for data transfer across multiple index servers of the distributed database, more balanced loads on each node, reduced network loads and congestion. The system further avoids remote commits by processing data locally on a database and enables constant parallel upload stream to each target index server with data to be inserted so that the I/O capacity may be used more efficiently.

Figure 1A:
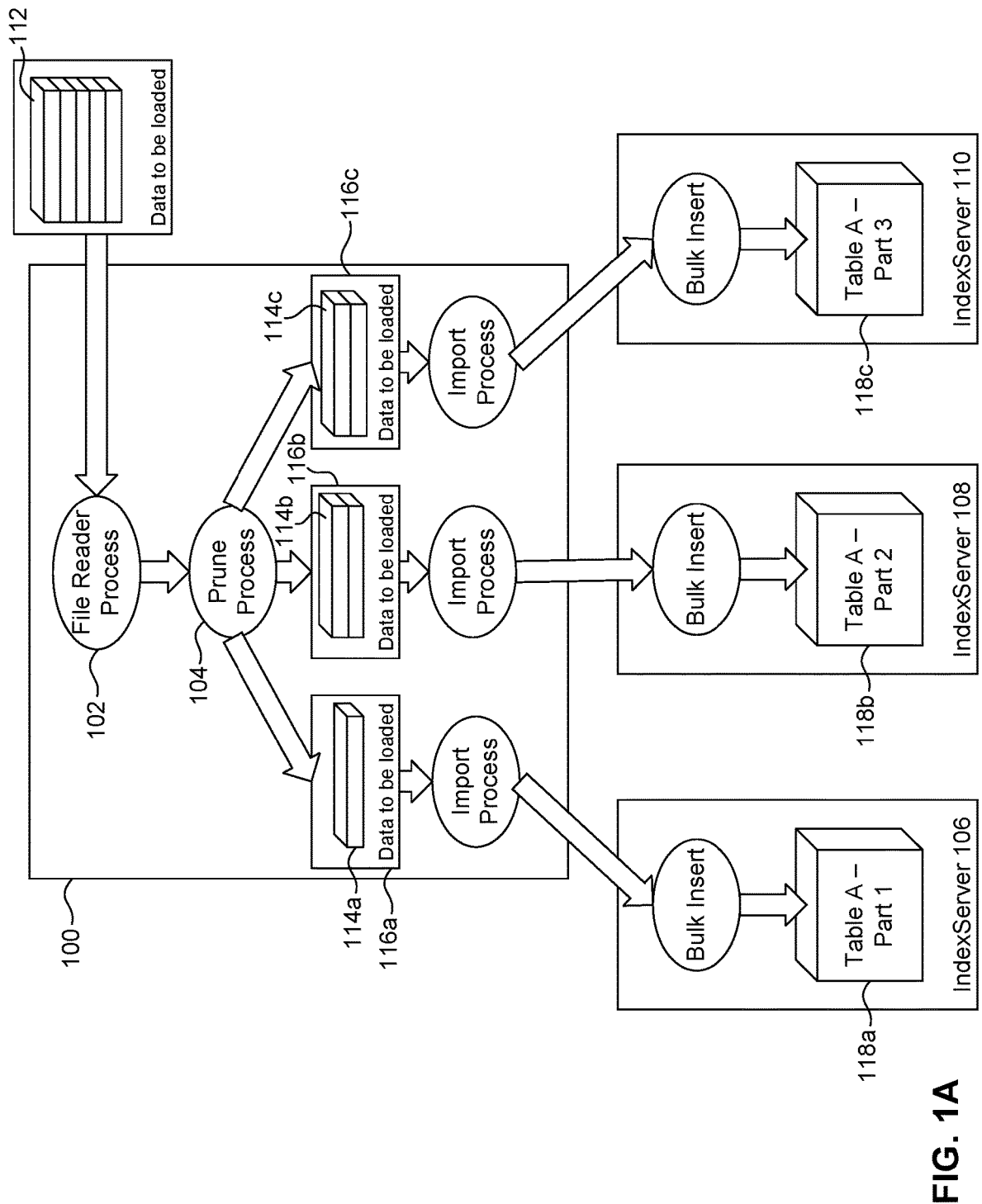
FIGS. 1A-1B are block diagrams of a system for initiating bulk inserts according to an example embodiment.
Figure 1B:
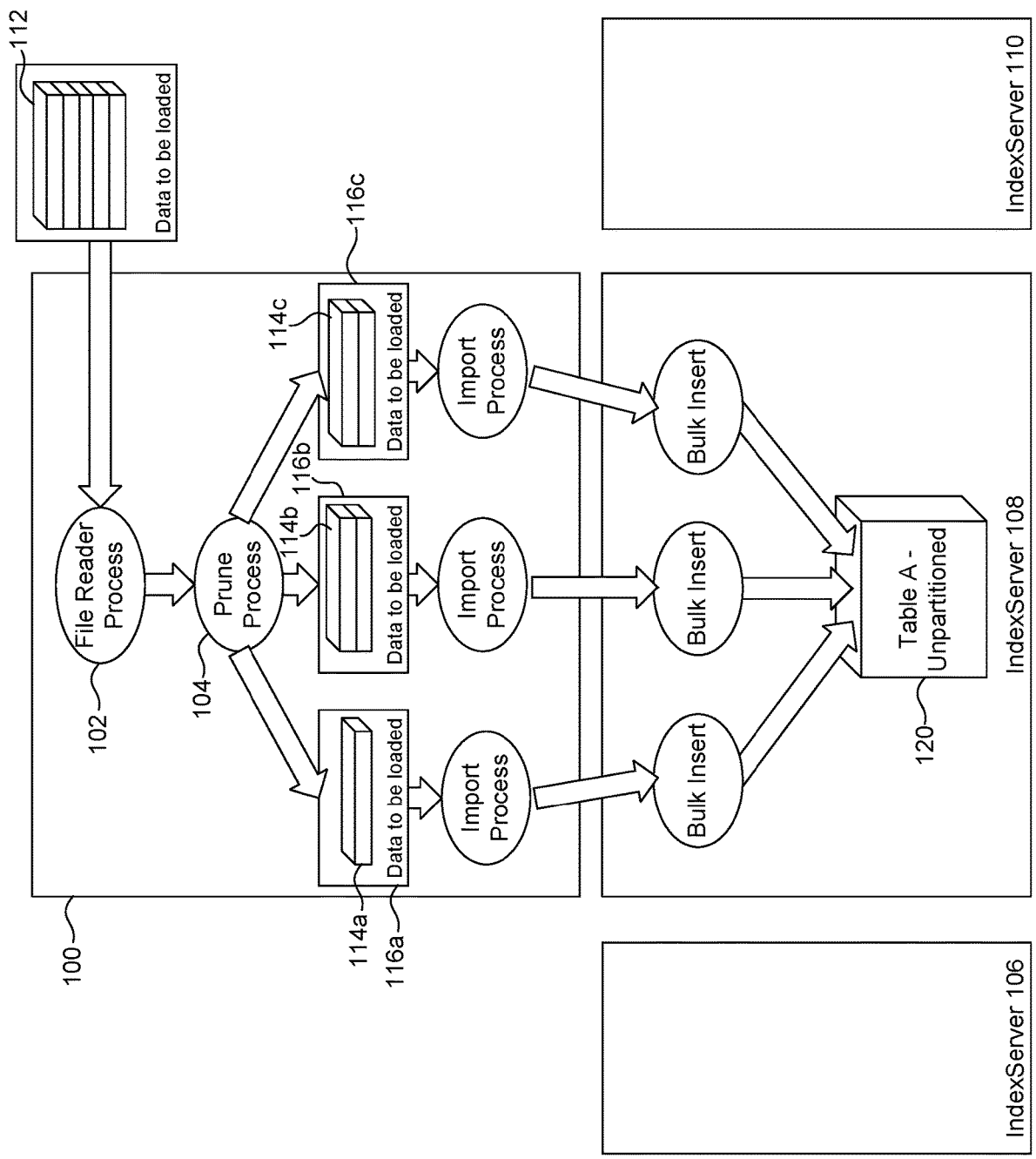

FIGS. 1A-1B are block diagrams of a system for initiating bulk inserts according to an example embodiment. With reference to FIG. 1A, the system may include a client device 100 including a file reader engine 102 and a pruning engine 104. The system may further include index server 106, index server 108 and index server 110. A distributed database may include index servers 106-110. Furthermore, a table of the distributed database may be partitioned across the index servers 106-110. In this regard, each index server 106-110 may store a partitioned portion of the table. As a non-limiting example, the client device 100 implement a HANA client developed by SAP® Software Solutions. The HANA client may be allow the client device 100 to connect to the index servers 106-110. Index servers 106-110 may also be referred to as nodes or hosts.

In an embodiment, the client device 100 may connect with the index servers 106-110. The connection may be a JDBC, ODBC, or any other type of connection configured to connect to the index servers 106-110. Each of the index servers 106-110 may store table metadata. The client device 100 may determine from the metadata stored in each of the index servers 106-110, that index servers 106-110 store a particular partitioned table. For example, index servers 106-110 may each store a partition of Table A. The client device 100 may also determine from the metadata the partitioning criterion or algorithm implemented to partition data records when storing data in the portioned portions of the table. Furthermore, the client device 100 may determine from the metadata which column of the table is being used to determine/calculate the partition. The partition criterion may be specific to each table. That is, the partition criterion of a table different than the portion of table A stored in the index servers 106-110 may have a different partition criterion than table A.

The client device 100 may receive a stream of data records 112 to be inserted in the table. The file reader engine 102 may receive the data records forward the data records 112 to the pruning engine 104. The pruning engine 104 may prune or divide the data records based on the partition criterion. The data records 112 may be divided into subsets of data 114a-114c. The subsets of data 114a-c may be placed into buckets 116a-c corresponding to the partitioned portion of the table. For example, in the event, the table is partitioned into three portions, a first bucket 116a may be store a first subset of data records 114a which are to be stored in a first partitioned portion 118a, the second bucket 116b may store the second subset of data records 114b which are to be stored in a second partitioned portion 118b, and the third bucket 116c may store a third subset of data records 114c which is to be stored in a third partitioned portion 118c. The buckets 116a-c may keep receiving data records until the stream of data records is completed.

The client device 100 may establish a new connection with the index servers 106-110. The client device 100 may transmit insert statements for inserting the subset of data records included in the buckets to the respective index servers 106-110, in parallel. For example, the client device 100 may transmit insert statements for the first subset of data records 114a in the first bucket 116a to index server 106 storing the first partitioned portion 118a. The client device 100 may transmit insert statements for the second subset of data records 114*b* in second bucket 116*b* to index server 108 storing the first partitioned portion 118*b*. The client device 100 may transmit insert statements for the third subset of data records 114*c* in third bucket 116*c* to index server 110 storing the first partitioned portion 118*c*.

The index servers 106-110 may receive the insert statements from the client device 100. The index server 106 may process the insert statements for the first subset of data 114*a* in the first bucket 116*a*, to store the first subset of data 114*a* in the first partitioned portion 118*a* of the table. The index server 108 may process the insert statements for the second subset of data 114*b* in the second bucket 116*b*, to store the second subset of data 114*b* in the second partitioned portion 118*c* of the table. The index server 110 may process the insert statements for the third subset of data 114*b* in the third bucket 116*c*, to store the third subset of data 114*c* in the third partitioned portion 118*c* of the table.

As stated above, the client device 100 may prune the data records based on the partition criterion defined by the metadata of the index servers 106-110. The partition criterion may be range, range-range, hash, hash-range, range-hash, hash-hash, round robin, round robin-range.

Range partitioning is partitioning a table by based on a range of the values in a specified column of the table. For example, a table may store user information including addresses. The table may include a column for storing the zip code. The values of the zip codes may range from 20000-50000. The first partitioned portion 118*a* may store data records with zip codes in the range of 20000-32500. The second partitioned portion 118*b* may store data records with the zip codes in the range of 32501-42500. The third partitioned portion 118*c* may store data records with the zip codes in the range of 42501-50000. The ranges may be different sizes or the same sizes.

Range-range partitioning is multi-level partitioning is implemented with range partitioning at both levels. In this regard, range-range partitioning may include two ranges of partitioning. The first level of partitioning may partition a table based on a column storing a primary key of the table. For example, in the event the table is storing user information and the primary key is an 5 digit numeric user identifier (e.g., 12345). In the first level of partitioning, the table may be partitioned based on the primary key. For example, the first range may be user ids within the range of 10000-20000; the second range may be user ids within the range of 20001-30000; and the third range may be user ids in the range of 30001-40000. After the completion of the first level of partitioning, in the second level of partitioning, the table may be partitioned based on a value of a second column. For example, the partitioning criterion may be of the data records with the user ids in the range of 10000-20000, partition those data records based on user name. In particular, the partition criterion may define the ranges to be user last names starting in A-H, I-O, and P-Z. In view of this, the data records in the range of 10000-20000 may be further partitioned based on the user last name. The data records in the ranges 20001-30000 and 30001-40000 may also be further partitioned in the same fashion.

Hash partitioning may be implemented by applying a hash function to the value of a specified column of the table. For each hash partitioning specification, columns must be specified as partitioning columns. The actual values of these columns are used when the hash value is determined. If the table has a primary key, these partitioning columns may be part of the key. Multiple different partitioning columns may be used to implement the hash partitioning. The client device 100 may determine the hash function used by the index servers 106-110 by retrieving the hash function from the metadata stored in each index server 106-110. The hash function may indicate the specific columns in the table on which the hash function is being applied. The client device 100 may apply the same hash functions to the values stored in the same columns in the received data records.

Hash-range is multi-level partitioning is implemented with hash partitioning at the first level and range partitioning at the second level. For example, at the first level a table may be partitioned by applying a hash function to the value of a specified column of the table. At the second level the resulting partitions may be further partitioned based on a range defined in the partition criterion. For example, continuing with the earlier example the table may store user information. In the first level, the hash function may be applied to the table and the table may be partitioned into three partitions. Each of the three partitions may be further partitioned based on a month of the user's date of birth. For example, the range may be January-April, May-August, and September-December.

Range-hash is multi-level partitioning is implemented with range partitioning at the first level and hash partitioning at the second level. The first level may partition a table based on a specified range of a value stored in a specified column of the table. In the second level the table may be partitioned by applying a hash value to values of a column in the table. The column may be the same or different as the column which was used for the range partitioning.

Hash-hash partitioning is implemented with applying a hash function to specified column(s) of a table at both the first level and the second level. The hash function applied at the first level may be the same or different as the hash function applied at the second level.

Round-robin partitioning is implemented to provide an equal distribution of rows to partitions. With round-robin partitioning, new rows are assigned to partitions on a rotation basis. In this regard, the pruning engine may add one row at a time into each bucket 116*a-c* on a rotational basis. For example, first row from the data records may be added to bucket 116*a*, a second row may be added to bucket 116*b*, a third row may be added to 116*c*, a fourth row may be added to bucket 116*a*, and so on.

Round-robin-range partitioning is multi-level partitioning is implemented with round-robin partitioning at the first level and range partitioning at the second level. For example, at the first level a table may be partitioned assigning rows to partitions on a rotational basis. In the second level, the partitions may be further partitioned based on a specified range.

It can be appreciate other types of partitioning methodologies or criterion may be used to partition a table.

With reference to FIG. 1B, table 120 may be un-partitioned and may reside in index server 108. Index server 106 and 110 may not store partitions of table 120. In an embodiment, multiple buckets 116*a-c* for initiating bulk inserts into table 120. This increases parallelization. For example, while bulk inserting a bucket to index server 108 the client device 100 could prepare pipelining the next bucket to be inserted to the same index server 108.

A client device 100 may partition the received data records 112 based on a table metadata stored in the index server 108. The client device 100 may place the portioned data records 114*a-c* in a respective bucket 116*a-c* corresponding to partition. The client device 100 may establish a connection with the index server 108. The client device 100 may transmit insert statements for the data records for in each of the buckets 116*a-c* to the index server 108. The index server 108 may receive the insert statements and process the insert of the data records in the table 120.

Figure 2:
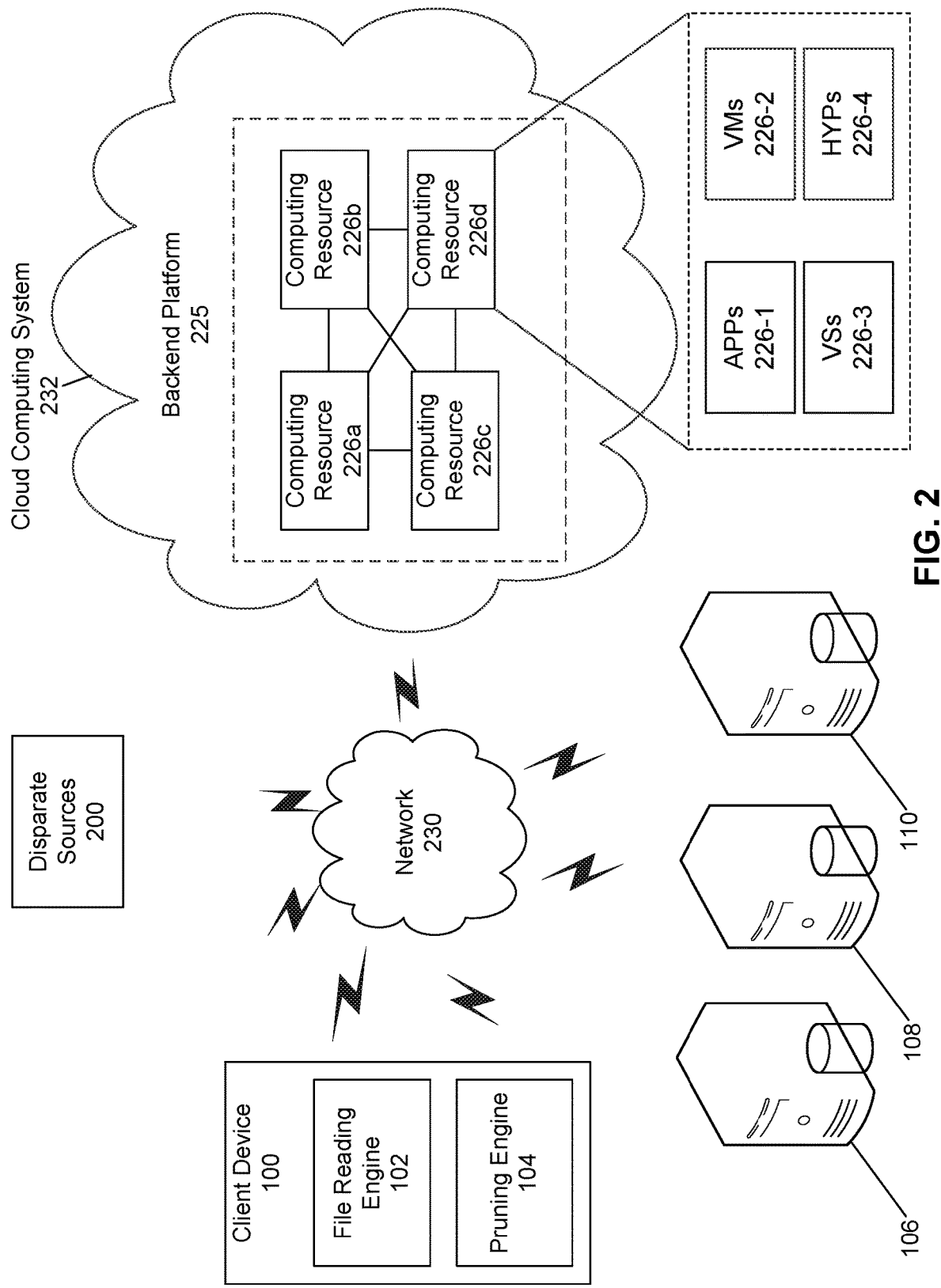
FIG. 2 is a block diagram of an example environment in which systems and/or methods described herein may be implemented according to an example embodiment.

FIG. 2 is a block diagram of an example environment in which systems and/or methods described herein may be implemented. The environment may include a client device 100, index servers 106-110, disparate sources 200, a backend platform 225, a cloud computing environment 232, and a network 230. The devices of the environment may be connected through wired connections, wireless connections, or a combination of wired and wireless connections.

In an example embodiment, one or more portions of the network 230 may be an ad hoc network, an intranet, an extranet, a virtual private network (VPN), a local area network (LAN), a wireless LAN (WLAN), a wide area network (WAN), a wireless wide area network (WWAN), a metropolitan area network (MAN), a portion of the Internet, a portion of the Public Switched Telephone Network (PSTN), a cellular telephone network, a wireless network, a WiFi network, a WiMax network, any other type of network, or a combination of two or more such networks.

The backend platform 225 may include one or more devices configured to host the file reader engine 102 and the pruning engine 104. The backend platform 225 may include a server or a group of servers. In an embodiment, the backend platform 225 may be hosted in a cloud computing environment 232. It may be appreciated that the backend platform 225 may not be cloud-based, or may be partially cloud-based.

The client device 100 and the index servers 102-106 may include one or more devices configured to interface with the backend platform 225. The client device 100 may include may include a file reading engine 102 and a pruning engine 104. The file reading engine 102 may read in data records from disparate sources 200 for loading the in the distributed database including index servers 106-110. The pruning engine 104 may partition data records based on a partition criterion of the index server 106-110. The disparate sources 200 may be any device(s) configured to initiate an input stream with the client device 100 to transmit data records to be input in the distributed database. It can be appreciated that the client device 100, index servers 102-106, and the disparate sources 200 may all partially or wholly reside on the cloud computing system 232. Alternatively, the client device 100, index servers 102-106, and the disparate sources 200 may reside outside the cloud computing system 232.

Each computing resource 226*a-d* includes one or more personal computers, workstations, computers, server devices, or other types of computation and/or communication devices. The computing resource(s) 226*a-d* may host the backend platform 225. The cloud resources may include compute instances executing in the computing resources 226*a-d*. The computing resources 126*a-d* may communicate with other computing resources 126*a-d* via wired connections, wireless connections, or a combination of wired or wireless connections.

Computing resources 226*a-d* may include a group of cloud resources, such as one or more applications ("APPs") 226-1, one or more virtual machines ("VMs") 226-2, virtualized storage ("VS") 226-3, and one or more hypervisors ("HYPs") 226-4.

Application 226-1 may include one or more software applications that may be provided to or accessed by user device 310 or the client device 360. In an embodiment, the messaging platform 100 may be executed locally on the client device 360 and the messaging platform 312 may be executed locally on the user device 310. Alternatively, the application 226-1 may eliminate a need to install and execute software applications on the user device 310 and client device 360. The application 226-1 may include software associated with backend platform 125 and/or any other software configured to be provided across the cloud computing environment 232. The application 226-1 may send/receive information from one or more other applications 226-1, via the virtual machine 226-2.

Virtual machine 226-2 may include a software implementation of a machine (e.g., a computer) that executes programs like a physical machine. Virtual machine 226-2 may be either a system virtual machine or a process virtual machine, depending upon the use and degree of correspondence to any real machine by virtual machine 226-2. A system virtual machine may provide a complete system platform that supports execution of a complete operating system (OS). A process virtual machine may execute a single program and may support a single process. The virtual machine 226-2 may execute on behalf of a user and/or on behalf of one or more other backend platforms 225, and may manage infrastructure of cloud computing environment 232, such as data management, synchronization, or long duration data transfers.

Virtualized storage 226-3 may include one or more storage systems and/or one or more devices that use virtualization techniques within the storage systems or devices of computing resource 226*a-d*. With respect to a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how administrators manage storage for end users. File virtualization may eliminate dependencies between data accessed at a file level and location where files are physically store. This may enable optimization of storage use, server consolidation, and/or performance of non-disruptive file migrations.

Hypervisor 226-4 may provide hardware virtualization techniques that allow multiple operations systems (e.g., "guest operating systems") to execute concurrently on a host computer, such as computing resource 226*a-d*. Hypervisor 226-4 may present a virtual operating platform to the guest operating systems, and may manage the execution of the guest operating systems multiple instances of a variety of operating systems and may share virtualized hardware resources.

As a non-limiting example, a distributed database named 'TST' may have one master host (e.g., index server 106) and two slave hosts (e.g., index servers 108-110). A table named 'CUSTOMER' may store customer information. The table may be partitioned across the master index server 106 and the slave index servers 108-110. A column in the table may include a date of birth. The table may be partitioned across the master index server 106 and the slave index servers 108-110 based on a partition criterion. The partition criterion may be a range partition based on the column storing the date of birth. The type of data may be a date. The partitioning may be implemented as follows CREATE COLUMN TABLE CUSTOMER (CID BIGINT, NAME NVACHAR (256),
DATE_OF_BIRTH DATE)
PARTITION BY RANGE (DATE OF BIRTH)
(PARTITION '1970-01-01'<=VALUES<'1990-01-01' AT LOCATION 'master',
PARTITION '1990-01-01<=VALUES<'2000-01-01' AT LOCATION 'slave 1', PARTITION '2000-01-01<=VALUES<'2030-01-01' AT LOCATION 'slave 2');

The table also describes that the records are distributed in the database, based on the range of column DATE_OF_BIRTH. In this regard, the master server 106 may store a partition corresponding to customer date of births ranging from Jan. 1, 1970 to Dec. 31, 1989. The slave index server 108 may store a partition corresponding to the data records where the customer's date of birth falls within the range of Jan. 1, 1990 to Dec. 31, 1999. The slave index server 110 may store a partition corresponding to the data records where the customer's date of birth falls within the range of Jan. 1, 2000 to Dec. 31, 2029.

The file reader engine 102 may read in data records as follows:
{1234, 'Peter', '1975-09-09'},
{1235, 'Paul', '1985-09-09'},
{1236, 'Marry', '1981-09-09'},
{1237, 'Daniel', '1996-09-09'},
{1238, 'James', '2006-09-09'}

The pruning engine 104 may partition each data record based on the range partitioning criterion described above. In particular, the pruning engine 104 may place data records, {1234, 'Peter', '1975-09-09'}, {1235, 'Paul', '1985-09-09'}, and {1236, 'Marry', '1981-09-09'} in a first bucket. The first bucket may correspond to the partition stored in the master index server 106. The pruning engine 104 may place data record, {1237, 'Daniel', '1996-09-09'} in a second bucket. The second bucket may correspond to the partition stored in the slave index server 108. The pruning engine 104 may place the data record {1238, 'James', '2006-09-09'} in a third bucket. The third bucket may correspond to the partition stored in the slave index server 110.

The client device 100 may establish a connection with master index server 106 and slave index servers 108-110. The client device 100 may transmit the insert statements of the data records in the first bucket to the master index server 106, the data records of the second bucket to the slave index server 108, and the data records of the third bucket to the slave index sever 110, in parallel. The master index server 106 and slave index servers 108-110 may process the insert statements and insert the data records in the partition of the table stored in the respective master or slave index server 106-110.

Figure 3:
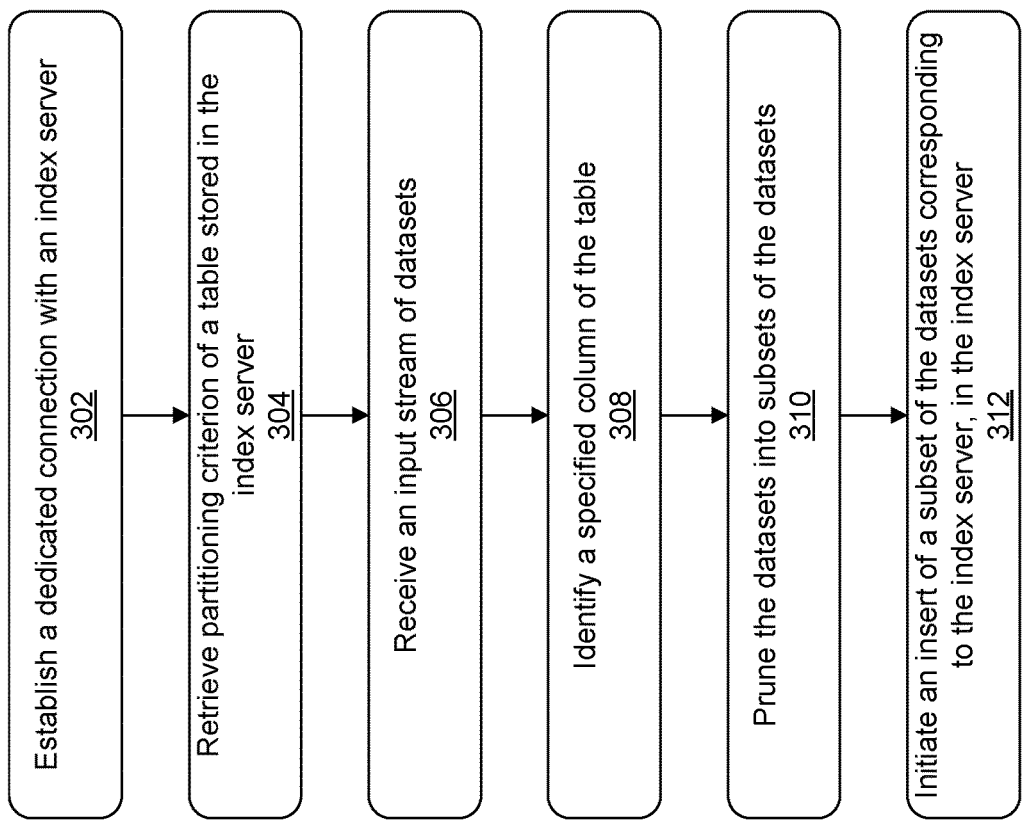
FIG. 3 is a flowchart illustrating the process of initiating bulk inserts in accordance to an example embodiment.

FIG. 3 is an example flowchart 300 for providing a bulk insert in a distributed database. It is to be appreciated the operations may occur in a different order, and some operations may not be performed. Merely as an example, the flow of data will be described with respect to FIGS. 1A-2.

In operation 302, a client device may establish a dedicated connection with an index server. The index server may store a partition of a table. The table may be partitioned across multiple index servers.

In operation 304, the client device may retrieve a partitioning criterion of a table stored in the index server. The partitioning criterion may be stored in metadata located in the index server. The partitioning criterion may be define the algorithm used to partition the table across the index servers.

In operation 306, the client device may receive input streams of data records.

In operation 308, the client device may identify a specified column of the table.

In operation 310, the client device may prune the data records into subsets of the data records according to the partitioning criterion and according to a type of data stored in the specified column of the table and the partitioning criterion. The partitioning criterion may define the type of data.

In operation 312, the client device may initiate an insert of a subset of the data records corresponding to a partition of the table stored in the index server, in the index server.

Figure 4:
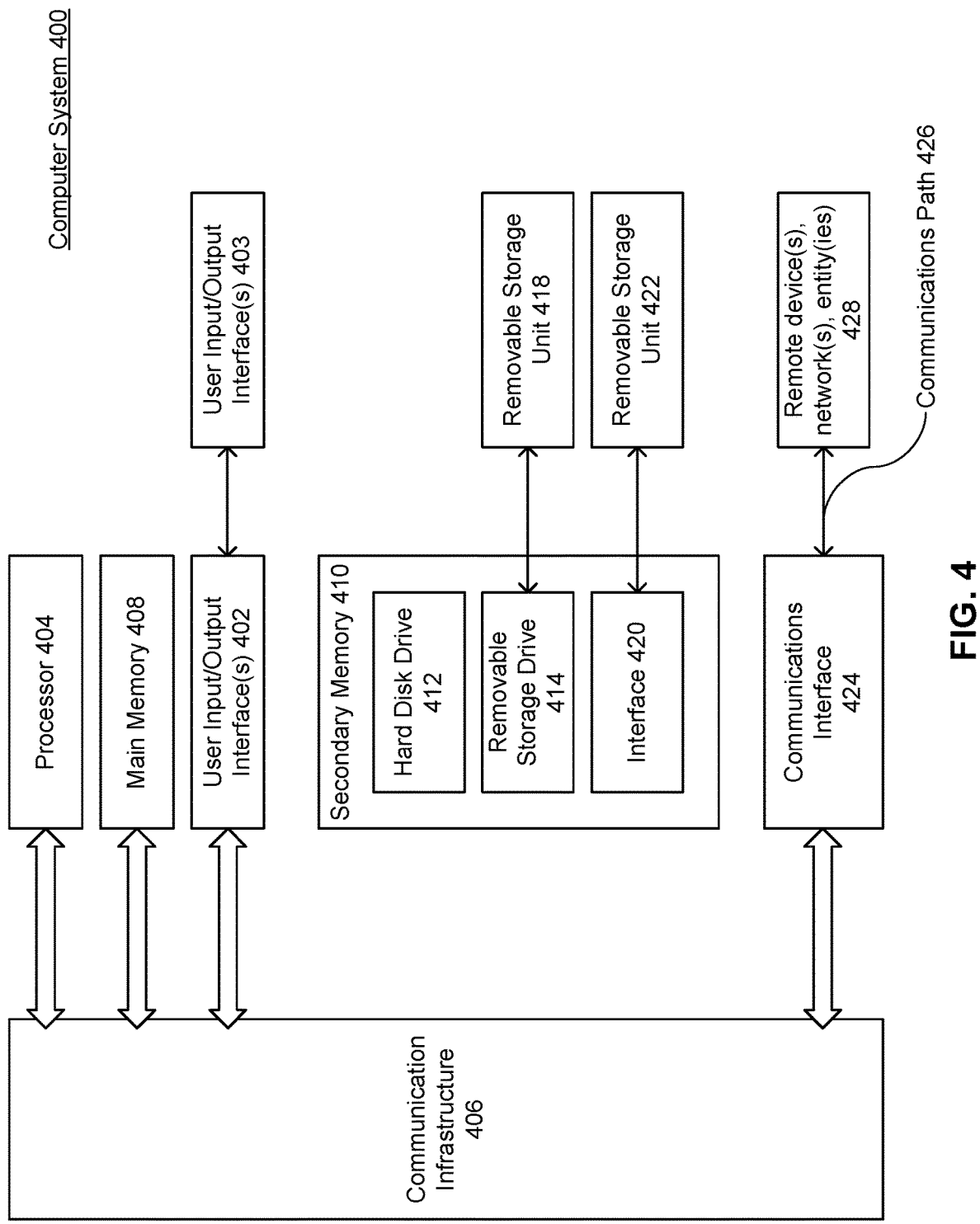
FIG. 4 is a block diagram of example components of a computing system according to an embodiment.

FIG. 4 is a block diagram of example components of device 400. One or more computer systems 400 may be used, for example, to implement any of the embodiments discussed herein, as well as combinations and sub-combinations thereof. Computer system 400 may include one or more processors (also called central processing units, or CPUs), such as a processor 404. Processor 404 may be connected to a communication infrastructure or bus 406.

Computer system 400 may also include user input/output device(s) 403, such as monitors, keyboards, pointing devices, etc., which may communicate with communication infrastructure 406 through user input/output interface(s) 402.

One or more of processors 404 may be a graphics processing unit (GPU). In an embodiment, a GPU may be a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 400 may also include a main or primary memory 308, such as random access memory (RAM). Main memory 308 may include one or more levels of cache. Main memory 408 may have stored therein control logic (i.e., computer software) and/or data.

Computer system 400 may also include one or more secondary storage devices or memory 410. Secondary memory 410 may include, for example, a hard disk drive 412 and/or a removable storage device or drive 414.

Removable storage drive 414 may interact with a removable storage unit 418. Removable storage unit 418 may include a computer usable or readable storage device having stored thereon computer software (control logic) and/or data. Removable storage unit 418 may be program cartridge and cartridge interface (such as that found in video game devices), a removable memory chip (such as an EPROM or PROM) and associated socket, a memory stick and USB port, a memory card and associated memory card slot, and/or any other removable storage unit and associated interface. Removable storage drive 414 may read from and/or write to removable storage unit 418.

Secondary memory 410 may include other means, devices, components, instrumentalities or other approaches for allowing computer programs and/or other instructions and/or data to be accessed by computer system 400. Such means, devices, components, instrumentalities or other approaches may include, for example, a removable storage unit 422 and an interface 420. Examples of the removable storage unit 422 and the interface 420 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 400 may further include a communication or network interface 424. Communication interface 424 may enable computer system 400 to communicate and interact with any combination of external devices, external networks, external entities, etc. (individually and collectively referenced by reference number 428). For example, communication interface 424 may allow computer system 400 to communicate with external or remote devices 428 over communications path 426, which may be wired and/or wireless (or a combination thereof), and which may include any combination of LANs, WANs, the Internet, etc. Control logic and/or data may be transmitted to and from computer system 400 via communication path 426.

Computer system 400 may also be any of a personal digital assistant (PDA), desktop workstation, laptop or notebook computer, netbook, tablet, smart phone, smart watch or other wearable, appliance, part of the Internet-of-Things, and/or embedded system, to name a few non-limiting examples, or any combination thereof.

Computer system 400 may be a client or server, accessing or hosting any applications and/or data through any delivery paradigm, including but not limited to remote or distributed cloud computing solutions; local or on-premises software ("on-premise" cloud-based solutions); "as a service" models (e.g., content as a service (CaaS), digital content as a service (DCaaS), software as a service (SaaS), managed software as a service (MSaaS), platform as a service (PaaS), desktop as a service (DaaS), framework as a service (FaaS), backend as a service (BaaS), mobile backend as a service (MBaaS), infrastructure as a service (IaaS), etc.); and/or a hybrid model including any combination of the foregoing examples or other services or delivery paradigms.

Any applicable data structures, file formats, and schemas in computer system 400 may be derived from standards including but not limited to JavaScript Object Notation (JSON), Extensible Markup Language (XML), Yet Another Markup Language (YAML), Extensible Hypertext Markup Language (XHTML), Wireless Markup Language (WML), MessagePack, XML User Interface Language (XUL), or any other functionally similar representations alone or in combination. Alternatively, proprietary data structures, formats or schemas may be used, either exclusively or in combination with known or open standards.

In some embodiments, a tangible, non-transitory apparatus or article of manufacture comprising a tangible, non-transitory computer useable or readable medium having control logic (software) stored thereon may also be referred to herein as a computer program product or program storage device. This includes, but is not limited to, computer system 400, main memory 308, secondary memory 410, and removable storage units 418 and 422, as well as tangible articles of manufacture embodying any combination of the foregoing. Such control logic, when executed by one or more data processing devices (such as computer system 400), may cause such data processing devices to operate as described herein.

Embodiments of the present invention have been described above with the aid of functional building blocks illustrating the implementation of specified functions and relationships thereof. The boundaries of these functional building blocks have been arbitrarily defined herein for the convenience of the description. Alternate boundaries may be defined so long as the specified functions and relationships thereof are appropriately performed.

The foregoing description of the specific embodiments will so fully reveal the general nature of the invention that others may, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described exemplary embodiments, but should be defined only in accordance with the following claims and their equivalents.

What is claimed is:

1. A computer-implemented method for providing bulk inserts, comprising:
    establishing, by one or more computing devices, a first dedicated connection with an index server storing a partition of a database table;
    retrieving, by the one or more computing devices, the partitioning criterion of the database table stored in metadata in the index server;
    determining, by the one or more computing devices, the database table stored in the index server and a column of the database table used for the partitioning criterion from the metadata;
    receiving, by the one or more computing devices, an input stream of data records;
    pruning, by the one or more computing devices, the data records into subsets of the data records according to the partitioning criterion and the column of the database table used for the partitioning criterion; and
    establishing, by the one or more computing devices, a second dedicated connection with the index server for initiating an insert of a subset of the data records;
    initiating, by the one more computing devices, the insert of the subset of the data records corresponding to the partition of the database table stored in the index server, in the index server, in accordance to the partitioning criterion.

2. The method of claim 1, further comprising:
    pruning, by the one or more computing devices, the data records into the subsets of data records according to a type of data stored in the column of the database table.

3. The method of claim 1, wherein subsets of data records other than the subset of dataset corresponding to the partition of the table stored in the index server, correspond to partitions of the table stored in additional index servers.

4. The method of claim 3, further comprising initiating, by the one or more computing devices, an insert of the subset of the data records in the index server and the subsets of data records other than the subset of dataset in the additional index servers, in parallel.

5. The method of claim 1, wherein the index server and the additional index servers store a distributed database.

6. The method of claim 1, wherein the partition criterion is one of: range, hash, hash-range, or range-hash.

7. The method of claim 6, in response to identifying the partition criterion as hash, the method further comprising retrieving, by the one or more computing devices, a hash algorithm from the index sever.

8. A system for providing bulk inserts comprising:
    a memory;
    a processor copulated to the memory, the processor configured to:
        establish a first dedicated connection with an index server storing a partition of a database table;
        retrieve the partitioning criterion of the database table stored in metadata in the index server;

determine the database table stored in the index server and a column of the database table used for the partitioning criterion from the metadata;

receive an input stream of data records;

prune the data records into subsets of the data records according to the partitioning criterion and the column of the database table used for the partitioning criterion;

establish a second dedicated connection with the index server for initiating an insert of a subset of the data records; and initiate the insert of the subset of the data records corresponding to the partition of the table stored in the index server, in the index server, in accordance to the partitioning criterion.

9. The system of claim 8, wherein the processor is further configured to:

prune the data records into the subsets of data records according to a type of data stored in the column of the database table.

10. The system of claim 8, wherein subsets of data records other than the subset of dataset corresponding to the partition of the table stored in the index server, correspond to partitions of the table stored in additional index servers.

11. The system of claim 10, wherein the processor is further configured to initiate an insert of the subset of the data records in the index server and the subsets of data records other than the subset of dataset in the additional index servers, in parallel.

12. The system of claim 8, wherein the index server and the additional index servers store a distributed database.

13. The system of claim 8, wherein the partition criterion is one of: range, hash, hash-range, or range-hash.

14. The system of claim 13, wherein the processor further configured to retrieve a hash algorithm from the index server, in response to identifying the partition criterion as hash.

15. A non-transitory computer-readable medium storing instructions that when executed by one or more processors of a device cause the one or more processors to:

establish a first dedicated connection with an index server storing a partition of a database table;

retrieve the partitioning criterion of the database table stored in metadata in the index server;

determine the database table stored in the index server and a column of the database table used for the partitioning criterion from the metadata;

receive an input stream of data records;

prune the data records into subsets of the data records according to the partitioning criterion and the column of the database table used for the partitioning criterion;

establish a second dedicated connection with the index server for initiating an insert of a subset of the data records; and initiate the insert of the subset of the data records corresponding to the partition of the table stored in the index server, in the index server, in accordance to the partitioning criterion.

16. The non-transitory computer-readable medium of claim 15, wherein subsets of data records other than the subset of dataset corresponding to the partition of the table stored in the index server, correspond to partitions of the table stored in additional index servers.

17. The non-transitory computer-readable medium of claim 16, wherein the instructions when executed cause the one or more processors to: initiate an insert of the subset of the data records in the index server and the subsets of data records other than the subset of dataset in the additional index servers, in parallel.

18. The non-transitory computer-readable medium of claim 15, wherein the instructions when executed cause the one or more processors to prune the data records into the subsets of data records according to a type of data stored in the column of the database table.

19. The non-transitory computer-readable medium of claim 15, wherein the partition criterion is one of: range, hash, hash-range, or range-hash.

20. The non-transitory computer-readable medium of claim 15, wherein the instructions when executed cause the one or more processors to retrieve a hash algorithm from the index server, in response to identifying the partition criterion as hash.

* * * * *